May 5, 1964        G. F. MITCHELL        3,131,672
POULTRY NEST
Filed Dec. 20, 1962        2 Sheets—Sheet 2

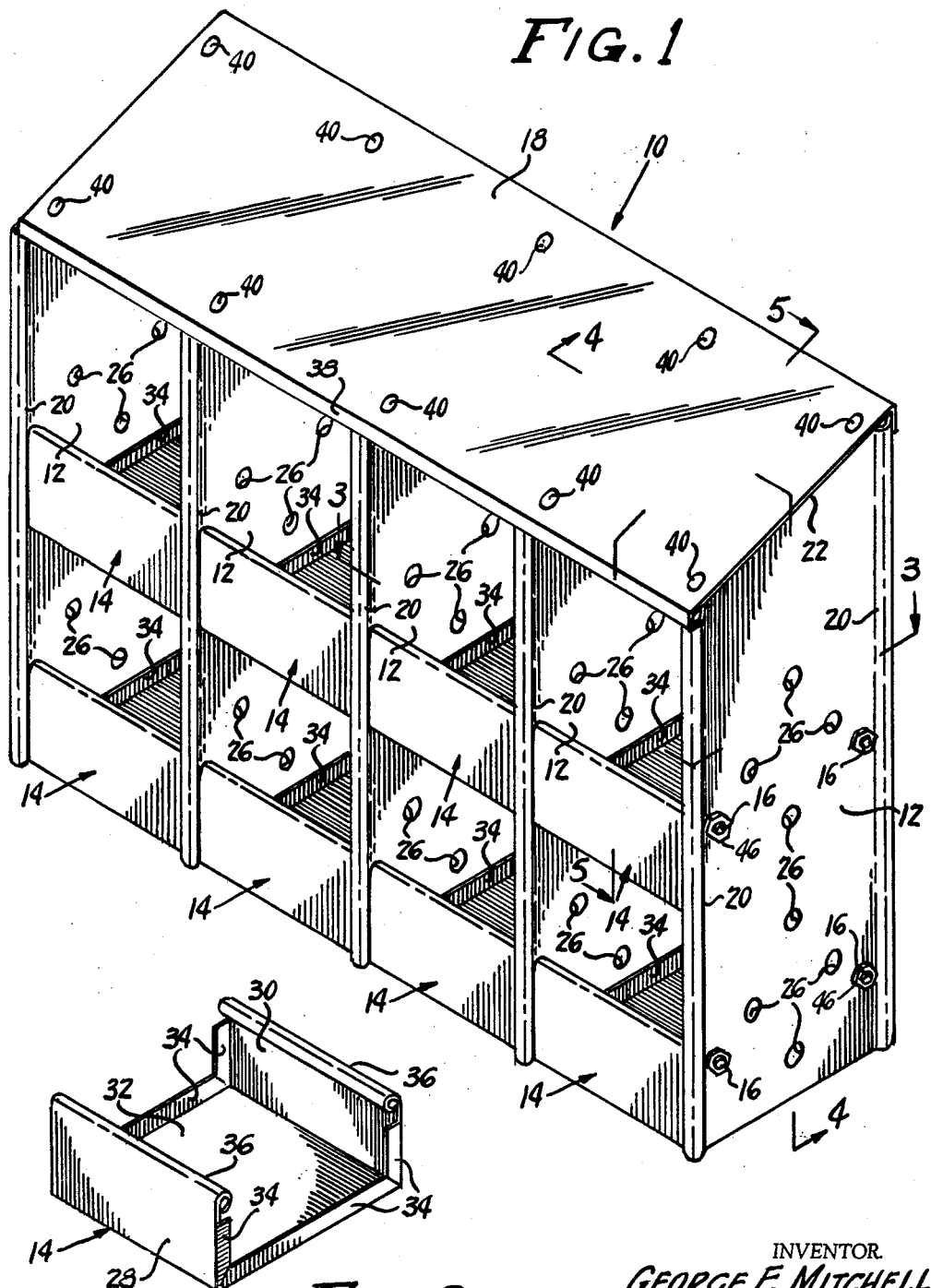
May 5, 1964     G. F. MITCHELL     3,131,672
POULTRY NEST
Filed Dec. 20, 1962     2 Sheets-Sheet 1
INVENTOR.
GEORGE F. MITCHELL
BY Kimmel & Crowell
ATTORNEYS.

INVENTOR.
GEORGE F. MITCHELL
BY Kimmel & Crowell
ATTORNEYS.

United States Patent Office 3,131,672
Patented May 5, 1964

3,131,672
POULTRY NEST
George F. Mitchell, Sidney, Ohio, assignor to Everyday Manufacturing Company, Sidney, Ohio
Filed Dec. 20, 1962, Ser. No. 246,248
4 Claims. (Cl. 119—45)

This invention relates to a poultry nest and relates more particularly to a nest which may be quickly and easily constructed in a variety of sizes.

A primary object of this invention is the provision of a poultry nest which is inexpensive to manufacture, sturdy in construction, and flexible in use.

Another object of this invention is the provision of a nest of the type described having a novel method of construction and design which eliminates a large percentage of fastening means necessary in the structures known heretofore.

A further object of the invention is to provide a poultry nest which will accommodate a variable number of chickens or the like and which may be quickly and easily assembled to suit the individual need.

A still further object of this invention is the provision of a poultry nest having nest sections which are integrally formed and which may be readily supported between vertical divider panels in rigid relationship thereto.

Another object of this invention is to provide a poultry nest having novel means to prevent the nest sections from rocking within their supports.

A still further object of the instant invention is the provision of a device of the type described wherein the individual nest sections have means to render them relatively rigid and to seal their contacts with vertical divider panels to retain thereon fine litter material.

Other and further objects reside in the combination of elements, arrangement of parts, and features of construction.

Still other objects will in part be obvious and in part be pointed out as the description of the invention proceeds and as shown in the accompanying drawings wherein:

FIGURE 1 is an isometric view of a poultry nest in accordance with the instant invention and having a plurality of sections in assembled relationship;

FIGURE 2 is an isometric view of an individual nest section;

Similar reference characters refer to similar parts throughout the several views of the drawing.

Figure 3:
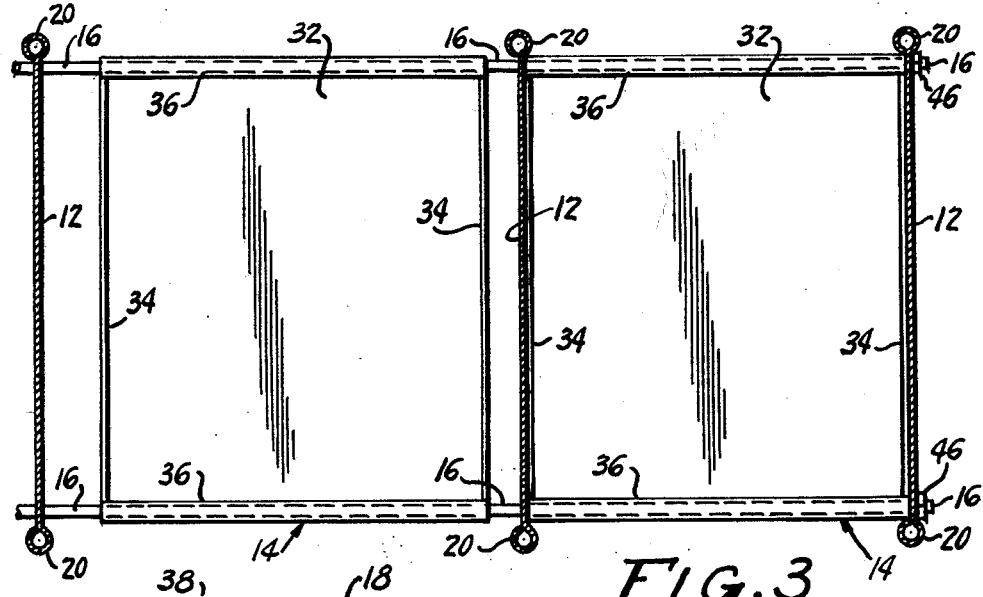
FIGURE 3 is an enlarged fragmentary cross-sectional view on line 3—3 of FIGURE 1 showing some of the components of the poultry nest during the assembly procedure.

Referring now to the drawings in general and more particularly to FIGURE 1, an assembled poultry nest is indicated generally by reference numeral 10. The poultry nest 10 is comprised of a plurality of vertical divider panels 12 supporting a plurality of individual nest sections 14 on horizontally extending rods 16 (note FIGS. 3–5) and having a top member 18 rigidly secured thereto.

The vertical divider panels 12 have their front and rear edges rolled to form tubular members 20 with portions extending on both sides of a plane through the flat portion of the panels 12 for a purpose to be described further hereinafter. Note particularly FIG. 3. The top edge of the vertical divider panels 12 are preferably formed on an angle as at 22 and have flange means 24 formed integral therewith for support and securing of the top member 18 in a manner to be described in further detail. A plurality of spaced openings 26 are defined in each vertical divider panel 12 to allow for the passage of air and apertures are also formed for the insertion of the rod members 16.

Figure 4:
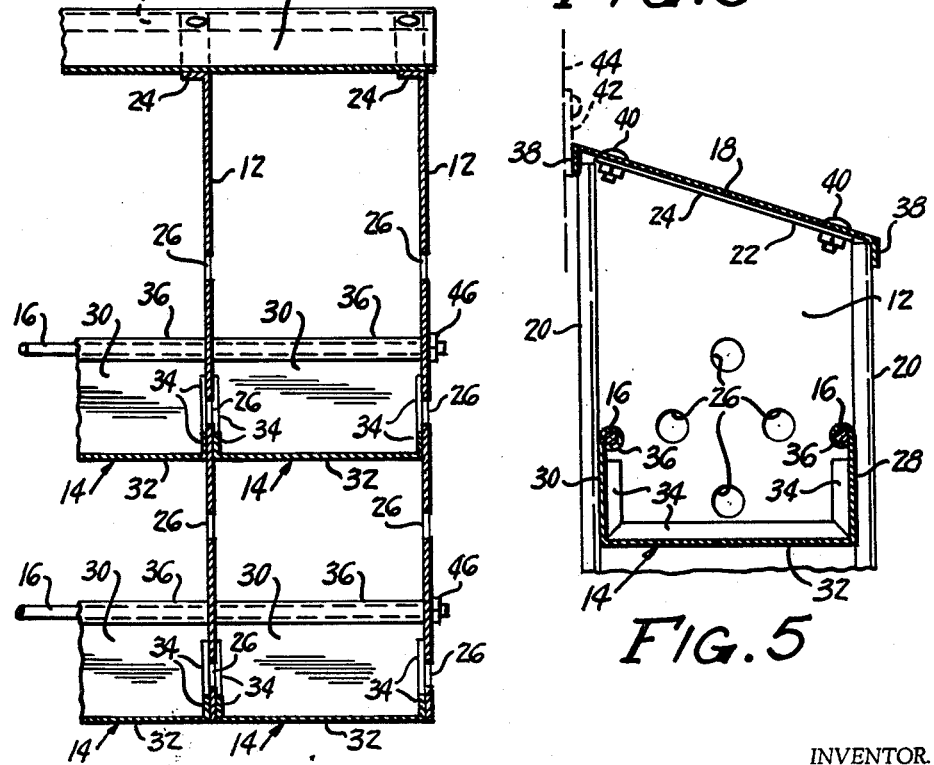
FIGURE 4 is an enlarged fragmentary cross-sectional view taken on line 4—4 of FIG. 1.
Figure 5:
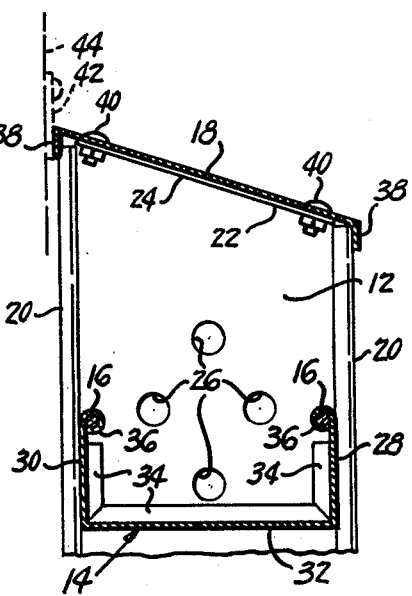
FIGURE 5 is an enlarged fragmentary cross-sectional view taken on line 5—5 of FIG. 1 with means for fastening the poultry nest to a rigid support shown in dotted lines.

Each of the individual nest sections 14 are comprised of a front panel 28, a rear panel 30 and a bottom panel 32 each having its side edges formed into inwardly extending right angular flange means 34 to provide rigidity and to seal the same against the vertical divider panels 12 when the poultry nest 10 is in assembled relationship as will be clearly seen in FIGS. 1 and 4. The top edges of the front and rear panels 28 and 30, respectively, of each nest section 14 are rolled inwardly to form tubular projections 36 for passage of the rod members 16.

The top member 18 preferably has downwardly extending front and rear flange means 38 and a plurality of apertures through which nuts and bolts 40 or the like may be inserted to secure the same to the flange means 24 on each of the vertical divider panels 12. Note particularly FIGURE 5. Any conventional fastening means, such as a plurality of apertured straps 42, may be secured to the rear flange 38 of the top member 18 for mounting the poultry nest 10 on a fixed structure such as wall 44 or the like.

The use and operation of the device of the instant invention will now be apparent. As shown particularly in FIGURE 3, the rod members 16 may be inserted through the apertures in one of the vertical divider panels 12 and nuts or the like 46 may be secured to their ends. Any number of nest sections 14 and additional vertical divider panels 12 may then be slid over the rod members 16 into abutting relationship and bolts or the like (not shown) may be fixed to the opposite ends of the rod members 16 when the entire structure 10 is assembled. Then, one elongated top member 18 or a plurality of shorter top members may be secured to the flange means 24 to complete the assembly. Since the tubular members 20 on the vertical divider panels 12 extend on both sides of a plane through the panels, as explained hereinabove, they will, in cooperation with the front and rear panels 28 and 30, respectively, of the individual nest sections 14, prevent the latter elements from rocking and provide a rigid structure. This construction is superior to the conventional 90° flanges or bends normally used since it will support the individual nest sections 14 on both sides, rather than the one support of the more conventional structure. The tubular projections 36 on the front and rear panels 28 and 30, respectively, of the individual nest sections 14 are formed in a substantially complete circle so that they cannot ride up on the rod members 16 and are rolled inwardly so that the panels 28 and 30 are at right angles to the bottom panel 32 thereby insuring a tight fit with the tubular projections 20 on the vertical divider panels 12. The flange means 34 on each nest section 14 provide rigidity and tightly seal the sections 14 against the vertical divider panels 12.

A variety of nest sizes can easily be produced by varying the width and number of nest sections 14 and the length of the rod members 16 and the top members 18. It is to be understood that while a total 8 nest sections 14 arranged in four vertically spaced pairs have been shown as illustrative, any number of the same may be provided along the length of the rods 16 and one, two or more nest sections 14 may be supported in vertically spaced relationship between each pair of vertical divider panels 12.

It is also to be understood that while the tubular members 36 on the front and rear panels 28 and 30 of the individual nest sections 14 may be used for perch supports, it is also contemplated that any conventional perch brackets may be fastened to the poultry nests 10 of the instant invention.

The vertical divider panels 12, nest sections 14 and top members 18 are preferably made of metal sheet bent into the desired form, but it is understood that any material, such as plastic or the like, may be used if desired.

It will now be seen that there is herein provided a device which satisfies all of the objectives of the instant invention, and others, including many advantages of great practical utility and commercial importance.

Since many embodiments may be made of this instant inventive concept and since many modifications may be made of the embodiments hereinbefore shown and described, it is to be understood that all matter herein is to be interpreted merely as illustrative, and not in a limiting sense.

I claim:

1. A poultry nest comprising, a plurality of similar trapezoidal-shaped essentially planar vertical sheet divider panels, means to equally horizontally and longitudinally space the panels from each other, each panel having vertical and parallel front and rear edges, a horizontal bottom edge and a slanting top edge, each panel deviating from planar form only by the presence of a minor perpendicularly offset flange along its top edge, and by the presence of identical rolled tubular projections on the front and rear edges, the projections having mirrored curved portions extending equally on both sides of a plane through the panel, a single essentially planar top or roof member longitudinally spanning the top edges and releasably secured to the offset flanges of every spaced panel, the top or roof member deviating from planar form only by the presence of downwardly and longituddinally extending flanges which enclose the top of the tubular projections of every panel, a plurality of nest sections each having vertical and rectangular front and rear panels of different vertical heights, and in integral bottom panel connecting the other panels, all nest bottom panels being of a constant width which is equal to the longitudinal dimension between the divider panels, and paired releasable means passing through each divider panel and through a portion of each of said front and rear nest panels, to rigidly hold said nest sections in spaced relationship below the roof and in hanging relationship tightly between each pair of vertical divider panels and the tubular projections thereon.

2. The structure of claim 1 wherein, additionally, a plurality of hanging means are secured in horizontally and longitudinally spaced relationship along the rear edge of the roof.

3. The structure of claim 1 wherein the front, bottom, and rear panels of the nest sections respectively, on their vertical, horizontal and vertical edge pairs, are formed with two sets of coplanar and block U-shaped flange means, said last-mentioned flange means being in tight abutting relationship to the divider panels by the said paired means when the poultry nest is assembled.

4. The structure of claim 1 wherein the upper edges of the front and rear panels of each nest section are formed as horizontal and closed circular periphery hollow tubes within the nest and between the planes of the front and rear nest panels, and the releasable nest holding means includes, paired apertures in the divider panels, rod means inserted through the pairs of apertures and also through aligned tubes of the nest, and means to secure the ends of the rod means with respect to adjacent divider panels.

References Cited in the file of this patent

UNITED STATES PATENTS

| | | |
|---|---|---|
| 1,603,461 | Harlacher | Oct. 19, 1926 |
| 2,781,023 | Brembeck | Feb. 12, 1957 |
| 2,892,447 | Keen et al. | June 30, 1959 |
| 3,062,185 | Kurtz | Nov. 6, 1962 |